(12) United States Patent
Maki et al.

(10) Patent No.: US 11,951,894 B2
(45) Date of Patent: Apr. 9, 2024

(54) MATERIAL HANDLER TOWER

(71) Applicant: Builtrite, LLC, Two Harbors, MN (US)

(72) Inventors: Broderick S. Maki, Duluth, MN (US); Maxwell N. Kleven, Duluth, MN (US); Jeffrey S. Abelsen, Two Harbors, MN (US)

(73) Assignee: Builtrite, LLC, Two Harbors, MN (US)

( * ) Notice: Subject to any disclaimer, the term of this patent is extended or adjusted under 35 U.S.C. 154(b) by 452 days.

(21) Appl. No.: 17/358,198

(22) Filed: Jun. 25, 2021

(65) Prior Publication Data

US 2022/0410787 A1 Dec. 29, 2022

(51) Int. Cl.
*B66F 7/18* (2006.01)
*B60P 1/54* (2006.01)
*B66C 23/00* (2006.01)
*B66C 23/42* (2006.01)
*B66C 23/80* (2006.01)

(52) U.S. Cl.
CPC ............ *B60P 1/5433* (2013.01); *B66C 23/42* (2013.01); *B66C 23/54* (2013.01); *B66C 23/80* (2013.01); *B66C 2700/0371* (2013.01)

(58) Field of Classification Search
CPC ....... B60P 1/5433; B66C 23/42; B66C 23/54; B66C 23/80; B66C 2700/0371; B66C 1/585; B66C 1/68
See application file for complete search history.

(56) References Cited

U.S. PATENT DOCUMENTS

| | | | | |
|---|---|---|---|---|
| 4,508,232 A | * | 4/1985 | Lampson | B66C 23/74 212/178 |
| 5,584,646 A | * | 12/1996 | Lewis | B66C 23/36 414/738 |
| 2021/0269288 A1 | * | 9/2021 | Hatch | B66C 23/40 |
| 2021/0277613 A1 | * | 9/2021 | Hendricks, Sr. | E01F 9/70 |
| 2021/0354960 A1 | * | 11/2021 | Faloney, Jr. | B66C 9/00 |

OTHER PUBLICATIONS

Webpage "https://builtrite.com/product/88-tm-truck-mounted-material-handler/" (Aug. 16, 2016), Model 88-TM Truck Mounted Material Handler Specifications Brochure, 4 pages.
Webpage "https://builtrite.com/product/1010-tm-truck-mounted-material-handler/" (Feb. 10, 2017), Model 1010-TM Truck Mounted Material Handler Specs High Rez Brochure, 2 pages.

(Continued)

*Primary Examiner* — Amy J. Sterling
(74) *Attorney, Agent, or Firm* — Fredrikson & Byron, P.A.

(57) ABSTRACT

A tower for a material handler includes a housing surrounding an interior space. The tower has an interior mounting system including a base plate through which a plurality of interior mount openings pass. The interior mount openings are located at positions of the base plate that are interior of the housing. In some embodiments, the tower is part of a material handler that also includes two stabilizers located on opposite sides of the tower, a platform located above the tower, and a boom projecting away from the platform.

20 Claims, 7 Drawing Sheets

(56) References Cited

OTHER PUBLICATIONS

Webpage "https://builtrite.com/product/1300-tm-truck-mounted-material-handler/" (Mar. 29, 2016), Model 1300-TM Truck Mounted Material Handler Specs-Rotated Brochure, 2 pages.
Webpage "https://builtrite.com/product/1380-tm-truck-mounted-material-handler/" (Aug. 1, 2018), Model 1380-TM Truck Mounted Material Handler Specifications-Rotated Brochure, 3 pages.
Webpage "https://builtrite.com/product/2200-tm-truck-mounted-material-handler/" (Sep. 23, 2015), Model 2200-TM Truck Mounted Material Handler Specs-Med-Rez-Rotated Brochure, 2 pages.
Webpage "https://builtrite.com/product/2280-tm-truck-mounted-material-handler-copy/" (May 28, 2020), Model 2280-TM Truck Material Handler Specs Brochure, 2 pages.
Webpage "https://issuu.com/joshmcteer/docs/11100_elite-t_t-910-915-brochure-en/8" (Sep. 17, 2017), Elite Truck and Tractor, Rotobec Tough Handling Equipment, 8 pages.
Design U.S. Appl. No. 29/796,635, filed Jun. 25, 2021, entitled "Material Handler Tower," 48 pages.

\* cited by examiner

US 11,951,894 B2

MATERIAL HANDLER TOWER

TECHNICAL FIELD

The present invention relates generally to material handlers. More particularly, the invention relates to material handler towers.

BACKGROUND

Material handlers are machines that can move material from one place to another, e.g., using a boom with a grapple at the end for grabbing and moving the material. Such handlers can be used to move all sorts of materials, such as construction and demolition waste, recycling, logs, railroad ties, highway barriers, pipes, large drilling or pipeline tooling, and many other materials. Certain material handlers, such as truck-mounted handlers and trailer-mounted handlers, include a tower. Above the tower, there is typically a platform. The platform is typically configured to rotate (e.g., about a vertical axis) relative to the tower, and the boom typically projects away from the platform. Material handlers of this nature can generally be mounted back of cab, tail mount or trailer mount. At the base of the tower, a horizontal rim is typically provided so as to project exteriorly from the housing of the tower. This exterior rim has mounting holes extending through it. The mounting holes receive fasteners that anchor the material handler to the truck or trailer, such that heads of the fasteners are located atop the mounting holes in the exterior rim, while a length of each fastener extends through the mounting hole and is attached to the truck or trailer.

SUMMARY

The invention provides a tower comprising a housing that surrounds an interior space. The tower includes an interior mounting system comprising a base plate through which a plurality of interior mount openings pass. The interior mount openings are located at positions of the base plate that are interior of the housing.

In some embodiments, the invention provides a material handler that includes such a tower. The material handler includes the tower, two stabilizers located on opposite sides of the tower, a platform located above the tower, and a boom projecting away from the platform. The platform is rotatable about a vertical axis relative to the tower.

DETAILED DESCRIPTION

Figure 1:
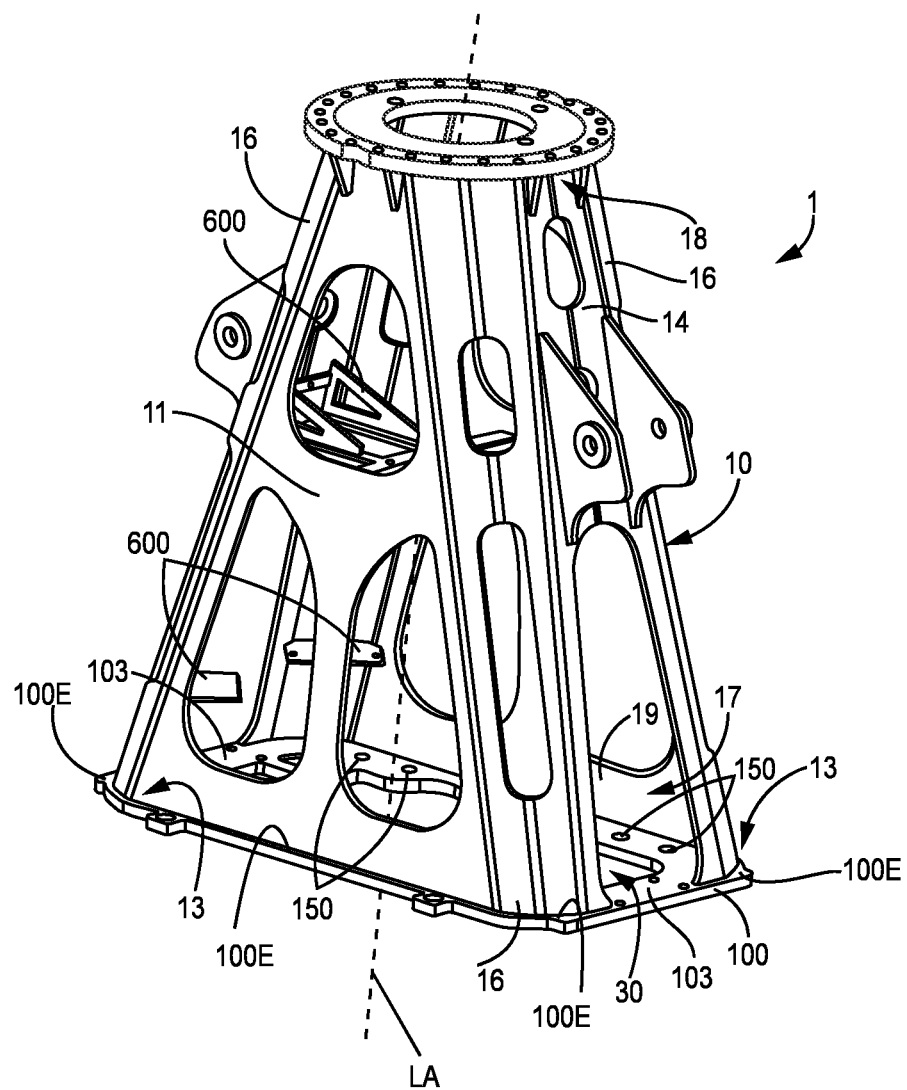
FIG. 1 is a perspective view of a material handler tower in accordance with certain embodiments of the present invention.

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the examples provided herein have many useful alternatives that fall within the scope of the invention.

The invention provides a tower 1 for a material handler 200. Reference is made to the non-limiting embodiment of FIG. 1. The tower 1 comprises a housing 10 surrounding an interior space 17. The tower 1 has an interior mounting system comprising a base plate 100 through which a plurality of interior mount openings 150 pass. The interior mount openings (e.g., holes) 150 are located at positions of the base plate 150 that are interior of (i.e., inside) the housing 10.

Figure 6A:
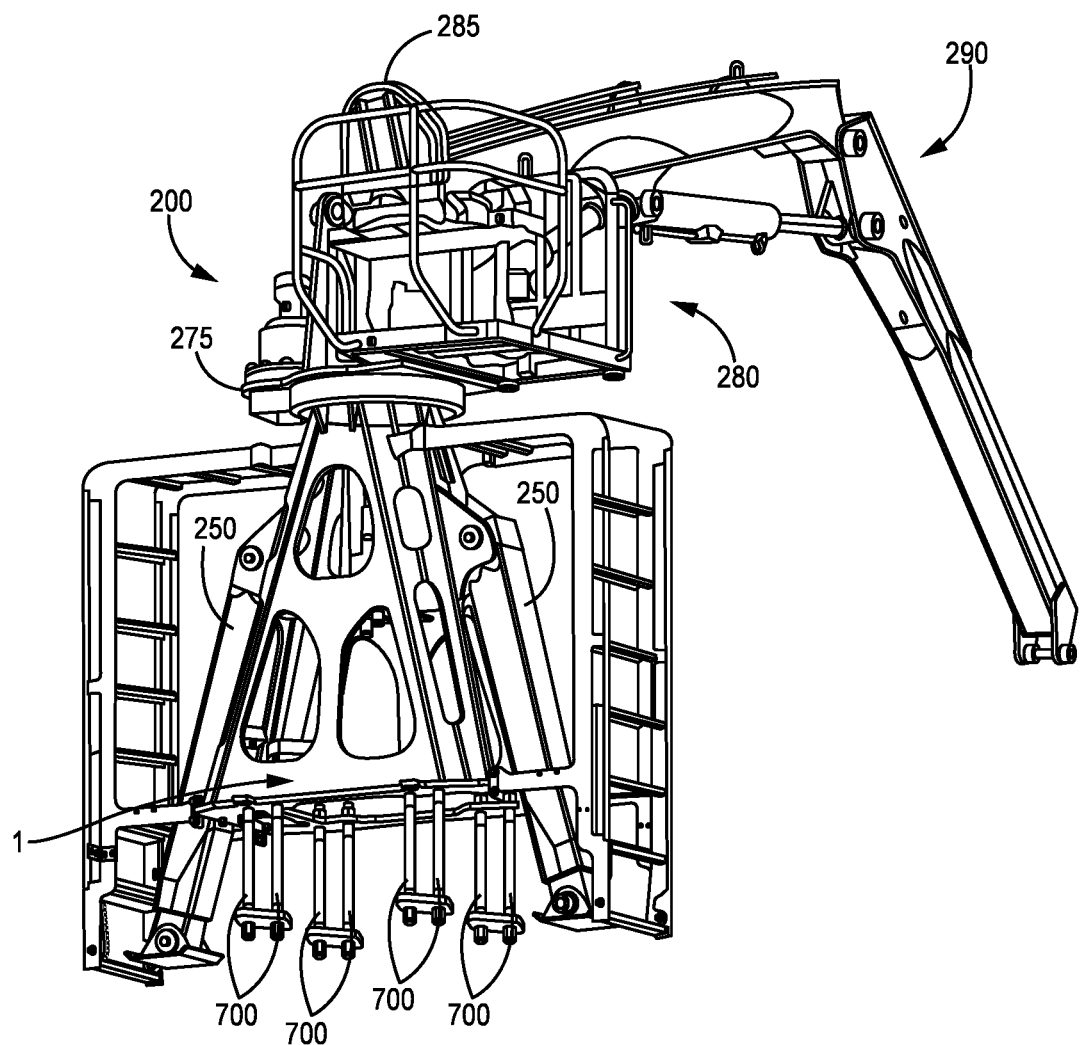
FIG. 6A is a perspective view of the material handler of FIG. 4 provided with a plurality of mounting fasteners in accordance with certain embodiments of the invention.
Figure 6B:
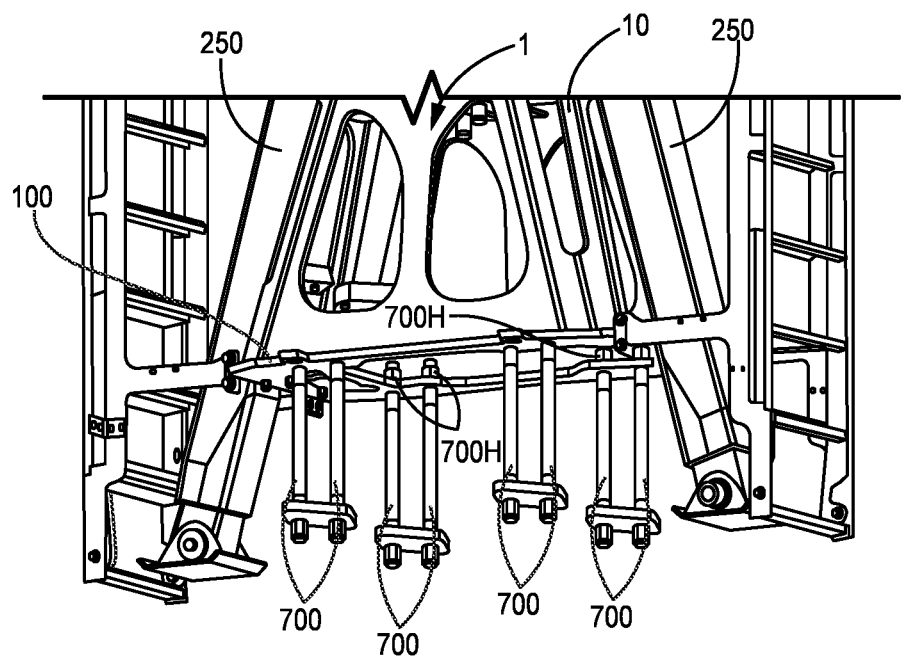
FIG. 6B is a partially broken-away detail view of the material handler of FIG. 6A.

The plurality of interior mount openings 150 are configured to respectfully receive a plurality of mounting fasteners 700 for attaching the tower 1 to a truck or trailer 300 (e.g., to a frame 350 thereof). FIG. 6B is a detail view of a non-limiting example of suitable mounting fasteners 700. More will be said of this later.

Thus, when the tower 1 is operably mounted on a truck or trailer 300 (see FIG. 5), a plurality of mounting fasteners 700 are respectfully received in the plurality of interior mount openings 150. In such cases, heads 700H of the mounting fasteners 700 will be atop the base plate 100. Reference is made to FIG. 6B.

As noted above, the interior mount openings 150 are inside the housing 10, such that when the mounting fasteners 700 are received in the interior mount openings, the housing protects the heads 700H of the fasteners from being struck by items moved around by the material handler 200 (in some situations, such strikes could shear off or otherwise damage a fastener head).

The base plate 100 can optionally be a single integral metal plate in which all of the interior mount openings 150 are formed. In other cases, two or more plate pieces (to which the tower housing is attached) can collectively define the base plate.

While various steels and other metals can be used for the base plate 100 and the housing 10, high strength steel (e.g., Fy=100,000 psi-130,000 psi) preferably is used. The thickness of the base plate 100 and housing 10 can vary. In certain preferred embodiments, the thickness is sufficient to handle the stress loads of mounting studs holding the handler overturning moment. In many cases, the base plate 100 and housing 10 thicknesses are less than 2 inches, such about 1 inch, 1¼ inches, 1½ inches, or 1¾ inches. In other cases (e.g., where extra weight and cost is less of a concern), the thickness is 3 inches or more.

In the illustrated embodiment, the base plate 100 has a generally rectangular shape. This is perhaps best seen in FIG. 2, where the illustrated base plate 100 has a generally rectangular, annular shape. It is to be appreciated, however, that the base plate can be provided in various different shapes, e.g., depending upon the shape of the housing 10.

Preferably, one or more (optionally each) of the interior mount openings are adjacent an upright wall of the housing. In such cases, the upright wall of the housing adjacent such an interior mount opening preferably has an uninterrupted height (extending upwardly from the base plate) that is higher than the head of a mounting fastener when received operably in such interior mount opening. In such cases, the uninterrupted height of such upright wall can optionally be higher than the heads of all the mounting fasteners received operably in the interior mount openings. This is the case in FIG. 6B. In some cases, the housing has opposed front and rear walls that each have such an uninterrupted height. Additionally or alternatively, some or all of the interior mount openings can be located closer to the nearest upright wall of the housing than to a longitudinal center axis LA of the housing.

The illustrated arrangement of interior mount openings 150 includes a first series of interior mount openings 150 that are spaced apart from one another alongside one 11 of the housing walls, while a second series of interior mount openings 150 is spaced apart from one another alongside another 19 of the housing walls. In the embodiment illustrated, the interior mount openings 150 of each of the first and second series are arranged in a row, such that the plurality of interior mount openings 150 comprises two rows of interior mount openings 150, with the two rows located respectively alongside two opposed walls 11, 19 of the housing 10. It is to be appreciated, however, that this particular arrangement is by no means required. To the contrary, many other arrangements, involving the same number, or a different number, of interior mount openings can be used.

In some cases, each interior mount opening 150 of the plurality of interior mount openings 150 is part of a pair of adjacent interior mount openings 150. In such cases, the interior mount openings 150 are provided in sets (or "clusters") of two. It is to be appreciated, however, that this is not required. Rather, many different mount opening arrangements and fastener assemblies can benefit from the present interior mounting system.

In the illustrated embodiment, the arrangement of the interior mount openings 150 is symmetrical about both X and Y axes (which axes are perpendicular to each other). Here, the X and Y axes lie in a plane perpendicular to the longitudinal axis LA of the housing 10. In the embodiment shown, the X axis is parallel to the front 11 and rear 19 walls, while the Y axis is parallel to the right 12 and left 14 walls. Here again, this is merely one suitable arrangement for the interior mount openings 150, the housing 10, and the base plate 10. Many other arrangements can be used, including various symmetrical and asymmetrical arrangements. Different arrangements of interior mount openings can be used with the housing embodiment shown. Moreover, for embodiments where the housing is cylindrical, generally cylindrical, or has some other configuration, various arrangements of interior mount openings can be used.

In some cases, the housing 10 has opposed front 11 and rear 19 walls, and two or more (optionally four or more) of the interior mount openings 150 are adjacent the front wall 11, while two or more (optionally four or more) other interior mount openings 150 are adjacent the rear wall 19. Here again, these details are merely exemplary; they are by no means limiting.

The housing 10 has a hollow configuration. As noted above, it surrounds an interior space 17. In certain embodiments, the housing 10 has a multi-sided (e.g., polygonal) configuration. The housing, for example, can optionally have eight or more sides, such as 8-12 sides. In some cases, the housing has 10 or more sides, such as 10-14 sides. In the embodiment illustrated, the housing has 12 sides (i.e., it is a dodecagon). The present discussion of sides refers to the shape formed by the housing 10 when viewed in a cross section taken perpendicular to the longitudinal axis LA of the housing (e.g., a horizontal cross section). In other cases, the housing can have various conventional cylindrical or generally cylindrical shapes, or various other polygonal shapes.

The illustrated housing 10 has a generally triangular, hollow configuration. Here, the housing 10 includes opposed front 11 and rear 19 walls, which are shown as the two largest walls (e.g., major walls) of the housing. The front 11 and rear 19 walls of the illustrated housing 10 each have a generally triangular configuration. In other cases, the housing may be cylindrical or generally cylindrical. In still other cases, the housing can have a cuboidal configuration.

The illustrated housing 10 also has opposed right 12 and left 14 walls. In the embodiment shown in the figures, the front 11, back 19, right 12, and left 14 walls together delineate a partial rectangle in a cross section taken perpendicular to a longitudinal axis LA of the housing 10.

Furthermore, the illustrated housing 10 includes a plurality of corner walls 16. Extending between the front wall 11 and the right wall 12 is a corner wall 16. Likewise, extending between the front wall 11 and the left wall 14 is a corner wall 16. Similarly, extending between the rear wall 19 and the right wall 12 is a corner wall 16. Finally, extending between the rear wall 19 and the left wall 14 is a corner wall 16. Thus, the illustrated housing design includes a front wall, a rear wall, a right wall, a left wall, and four corner walls. It is to be appreciated, however, that the benefits of the present interior mounting system can be achieved with many other housing configurations. The housing of the present invention can therefore have various different configurations, such as cylindrical or generally cylindrical configurations.

Preferably, the housing 10 has a bottom end region 13 that is joined to the base plate 100. The bottom end region 13 of the housing 10 can, for example, be welded to the base plate 100. The base plate 100 comprises an interior portion 103 that extends interiorly from the bottom end region 13 of the housing 10. The interior portion 103 of the base plate 100 is that portion located interior of (e.g., so as to bound the interior space 17 of) the housing 10. The interior mount openings 150 are located in the interior portion 103 of the base plate 100.

The housing 10 also has a top end region 18. Thus, the housing 10 extends from the bottom end region 13 to the top end region 18. The housing 10 has a height, which is measured along the longitudinal axis LA of the housing.

The height, length, and width of the tower 1 can be varied to accommodate different applications. In certain non-limiting example, the height is in a range of 55-80 inches, while the length is in a range of 35-75 inches, and the width is in a range of 20-55 inches. These dimensions, however, can be changed depending on the requirements of a desired material handler.

Figure 3:
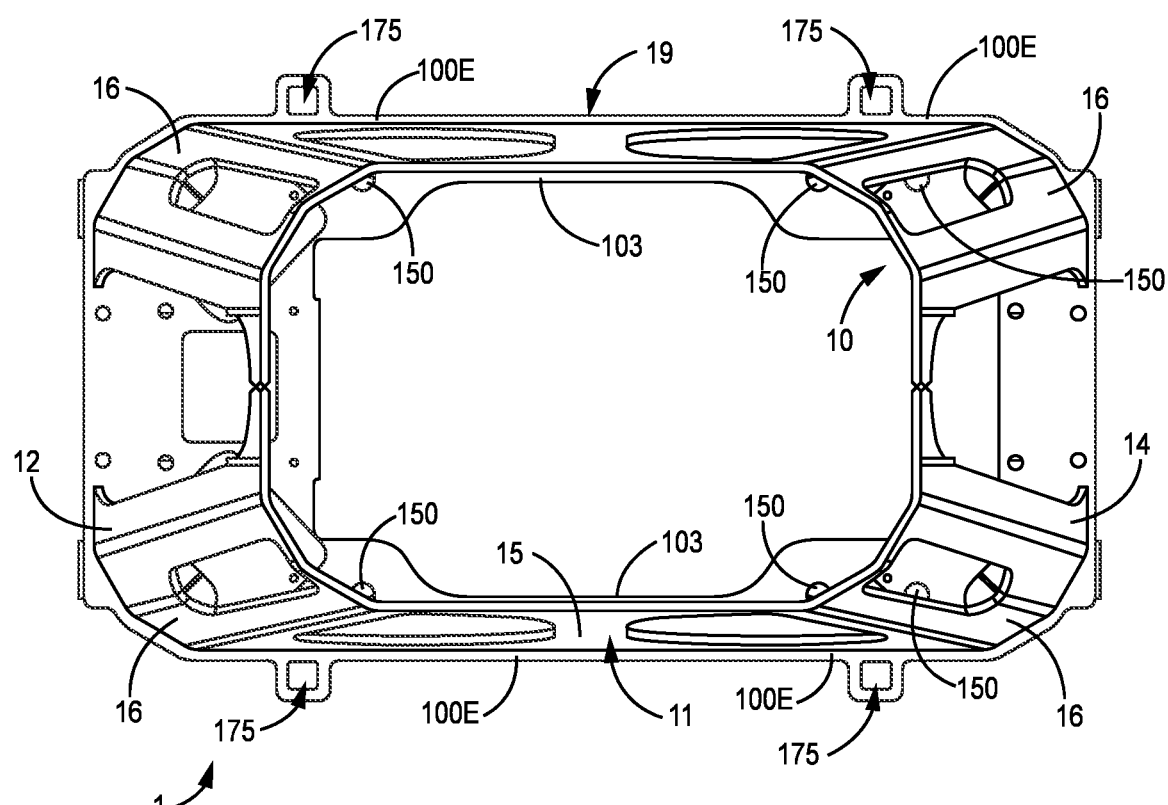
FIG. 3 is a cross-sectional view of the material handler tower of FIG. 1, with the cross section taken in a horizontal plane at a midpoint along the height of the tower.

Preferably, a central opening 30 passes through the interior portion 103 of the base plate 100. This is perhaps best appreciated by referring to FIGS. 1 and 3. The central opening 30 preferably is surrounded (e.g., in a plane perpendicular to the longitudinal axis LA of the tower 1), about 360 degrees, by the base plate 100.

When provided, the central opening 30 can have various different shapes. In the illustrated embodiment, the central opening 30 has multiple sides (e.g., six major sides). If desired, the central opening can be generally rectangular. Thus, in some embodiments, the central opening 30 is not circular or generally circular. If desired, the central opening can be generally oval shaped.

Figure 2:
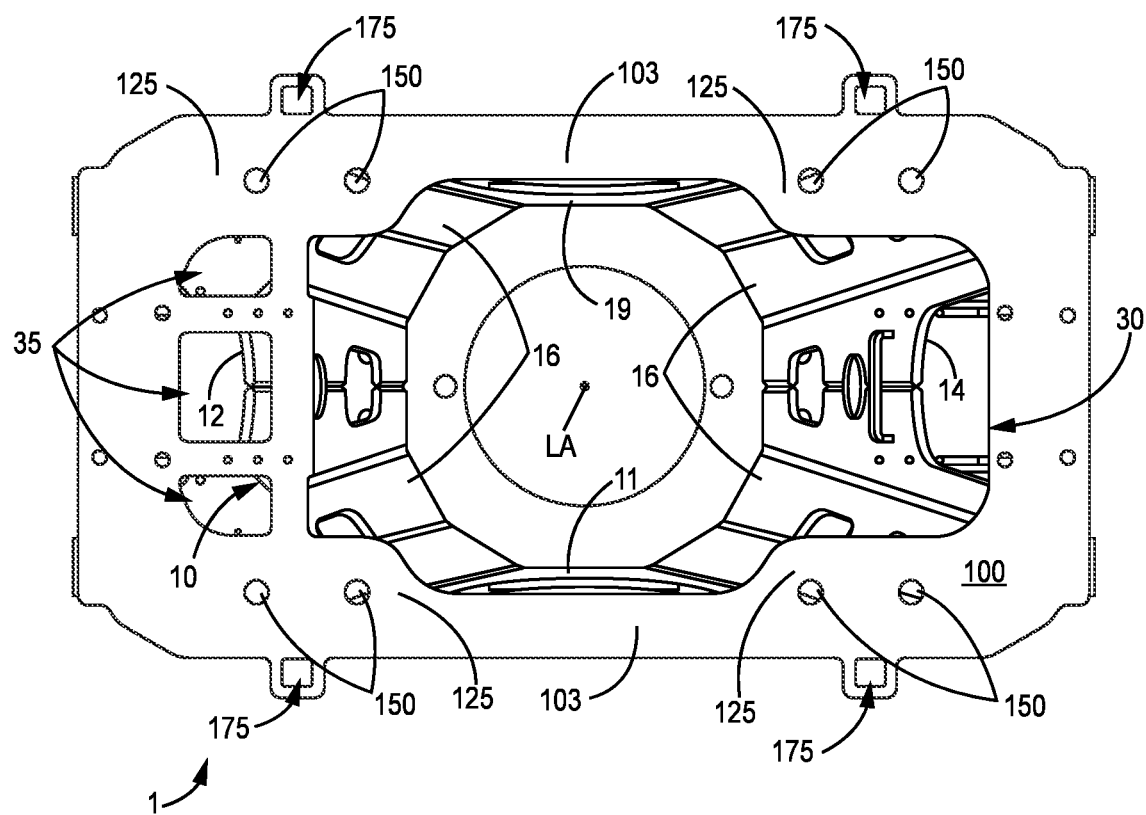
FIG. 2 is a bottom view of the material handler tower of FIG. 1.

In some cases, the tower 1 has a top opening (e.g., a circular top opening; see FIG. 1), and the central opening 30 in the base plate 100 has a larger area than the top opening of the tower. Reference is made to FIG. 2.

With continued reference to FIG. 2, it can be appreciated that the base plate 100 can optionally include one or more other openings 35 in addition to the central opening 30. This, however, is not required. When provided, the other opening(s) 35 can optionally include one or more polygonal openings, such as at least one generally rectangular opening. In the illustrated embodiment, the base plate 100 is a single integral plate in which the central opening 30 and a plurality of (e.g., three or more) other openings 35 are formed. In other cases, two or more plate pieces collectively define the base plate in which such openings are formed.

In some embodiments of the present invention, the housing 10 becomes more narrow/tapers in moving from the bottom end region 13 to the top end region 18. This is the case for the illustrated embodiment. Here, the bottom end region 13 of the housing 10 has a relatively broad dodecagon configuration (in a cross section perpendicular to the longitudinal axis LA), whereas the top end region 18 has a relatively narrow dodecagon configuration (in a cross section perpendicular to the longitudinal axis). Thus, the illustrated housing configuration has a dodecagon shape at both the bottom 13 and top 18 end regions, with the top end region 18 being more narrow than the bottom end region 13. As noted above, however, many other housing configurations can be used.

The bottom end region 13 of the illustrated housing 10 comprises four corner regions. In embodiments of this nature, the interior portion 103 of the base plate 100 can optionally comprise four corner regions 125 located respectively adjacent the four corner regions of the bottom end region 13 of the housing 10. In such embodiments, at least two of the interior openings 150 preferably are located in each of the four corner regions 125 of the interior portion 103 of the base plate 100. The base plate 100 can optionally be a single integral metal plate that defines all four corner regions 125.

In the illustrated embodiment, the four corner regions 125 of the interior portion 103 of the base plate 100 are flange regions. This, however, is not required. For example, the distance from the outside edge of the base plate to the central opening can alternatively be constant along the front and back sides of the base plate.

In some cases, the base plate 100 further includes an exterior rim portion 100E. This is perhaps best shown in FIGS. 1 and 3. When provided, the exterior rim portion 100E of the base plate 100 extends exteriorly from (i.e., is outside of) the bottom end region 13 of the housing 10. In embodiments of this nature, a plurality of exterior openings 175 can optionally be provided so as to pass through the exterior rim portion 100E of the base plate 100. If desired, the rim portion of the base plate can include one or more (e.g., a plurality of) exterior mount openings, such that in addition to the interior mount openings 150, the base plate includes at least one exterior mount opening. It is to be appreciated, however, that the exterior rim portion 100E may be omitted, or it may be present but without any exterior openings (in such cases, the base plate may have no openings outside of the housing).

The interior of the housing 10 preferably is equipped with one or more brackets 600. In the illustrated embodiment, the interior of the housing 10 has a plurality of brackets 600. The brackets are configured to hold hydraulic valves. It is to be appreciated, however, that many different structures can be used to hold hydraulic valves and/or guide hydraulic lines inside the housing 10. Thus, the brackets are not required. Moreover, when provided, the brackets may have different configurations, different locations, or both.

Once operably assembled, the tower preferably has one or more hydraulic lines extending through the interior space surrounded by the housing. In addition, brackets inside the housing preferably hold hydraulic valves in the interior space.

One non-limiting method of making the housing will now be described. First, tower uprights are cut (e.g., flame cut, water jet, laser, or other) from steel plate, preferably in two symmetrical pieces. Preferably, the uprights are formed using the minimum number of bends possible. All other tower parts are similarly cut from steel plate. Burned "etch lines" can be used for set-up, as well as fixtures for repeatability. Tower parts are weld-tacked in place, then structurally welded. Two vertical seams on the tower uprights are 100% groove welded. Slow cool is done to minimize deformation from weld heat input. The top surface is then machined to accept a rotation bearing (or, it is possible to weld on a pre-machined bearing plate).

Figure 4:
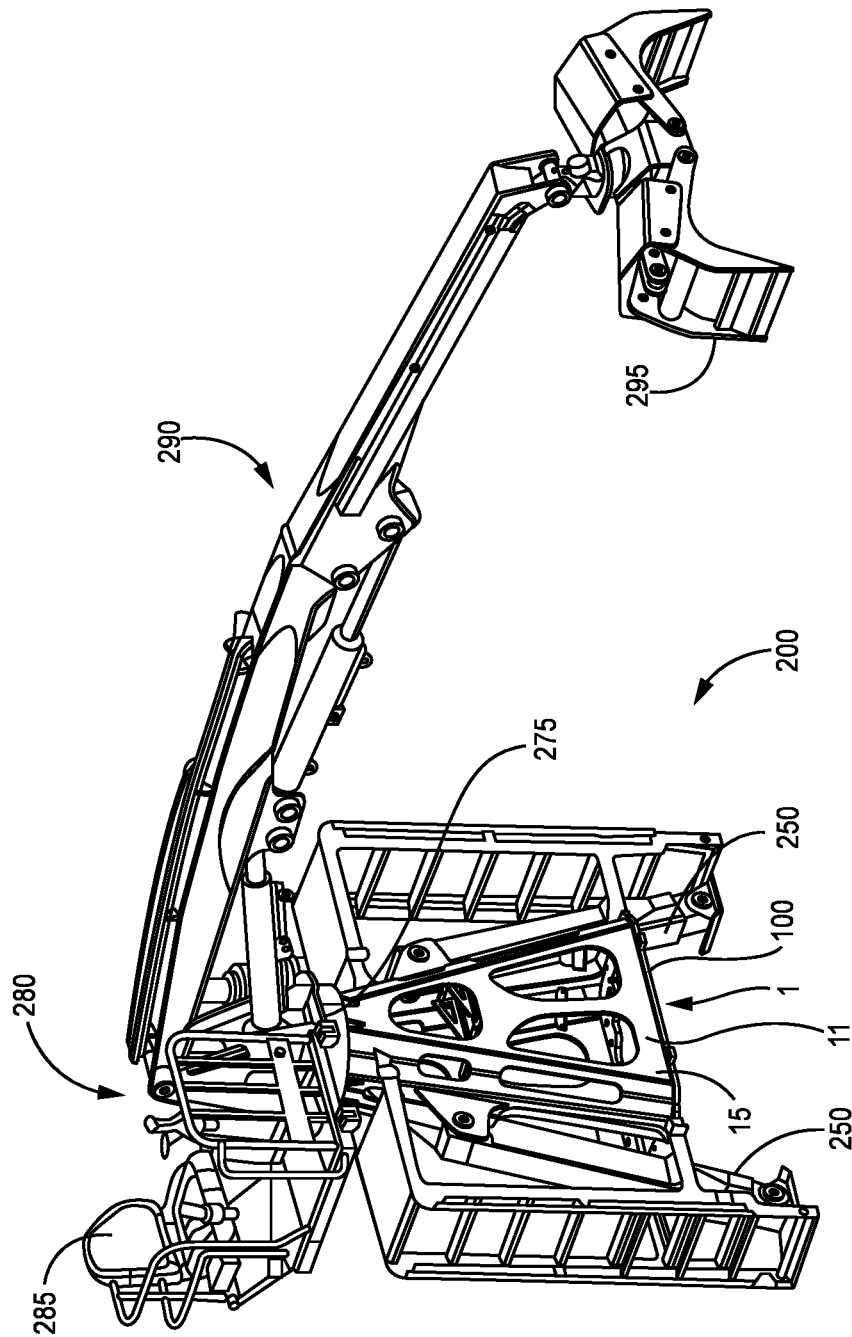
FIG. 4 is a perspective view of a material handler including the material handler tower of FIG. 1 in accordance with certain embodiments of the invention.

The tower 1 will ultimately be part of a material handler 200. The material handler 200 comprises two stabilizers 250 located on opposite sides of the tower 1, a platform 275 located above the tower, and a boom 290 projecting away from the platform. The platform 275 is rotatable about a vertical axis relative to the tower 1. A grapple 295 is attached to the boom 290. Reference is made to FIG. 4, which shows one non-limiting example of such a material handler 200. Here, the illustrated material handler 200 also includes an operator station 280 comprising an operator seat 285 and conventional manual operator controls. In other cases, the operator station is omitted and the material handler has a conventional remote control system.

As is conventional and well known, the boom has hydraulic cylinders which allow for movement and control of the boom and the grapple. Preferably, the material handler 200 is a knuckle-boom material handler, such that the boom 290 is configured to articulate among one or more joints.

The boom 290 can move the grapple 295 up and down, forward and rearward, and side-to-side. As is conventional and well known, the material handler preferably includes a hydraulic motor such that the boom is hydraulically actuated. Typically, the material handler is equipped with a plurality of hydraulic cylinders. For example, the boom may include a main boom cylinder and a stick boom cylinder. In some cases, it may also include a grapple cylinder. A variety of conventional boom cylinders are commercially available from different suppliers, such as Lemco Hydraulics of Hill City, Minnesota, USA. Thus, the material handler preferably has one or more (e.g., a plurality of) hydraulic lines on the boom.

Referring to FIG. 4, the boom 290 is shown with a grapple 295 attached to a distal end of the boom. The illustrated grapple 295 is a claw-like device configured to pick up items to be moved. As is well known to those skilled in this area of technology, the boom 290 can be equipped with any of a wide variety of different grapples or attachments. Thus, the grapple 295 can be any type of grapple or attachment known in the art, and will typically be selected based on the use intended for the material handler 200.

The illustrated grapple 295 can be replaced, for example, with various types of log grapples, combination grapples, clam shell grapples, compaction grapples, orange peel grapples, bucket attachments, glass pane attachments, rake attachments, railroad tie grapples, scrap handling attachments, pulpwood handling attachments, magnet rotators, butt tine grapples, tamping grapples, bale clamp grapples, or various rope or cable attachments.

Figure 5:
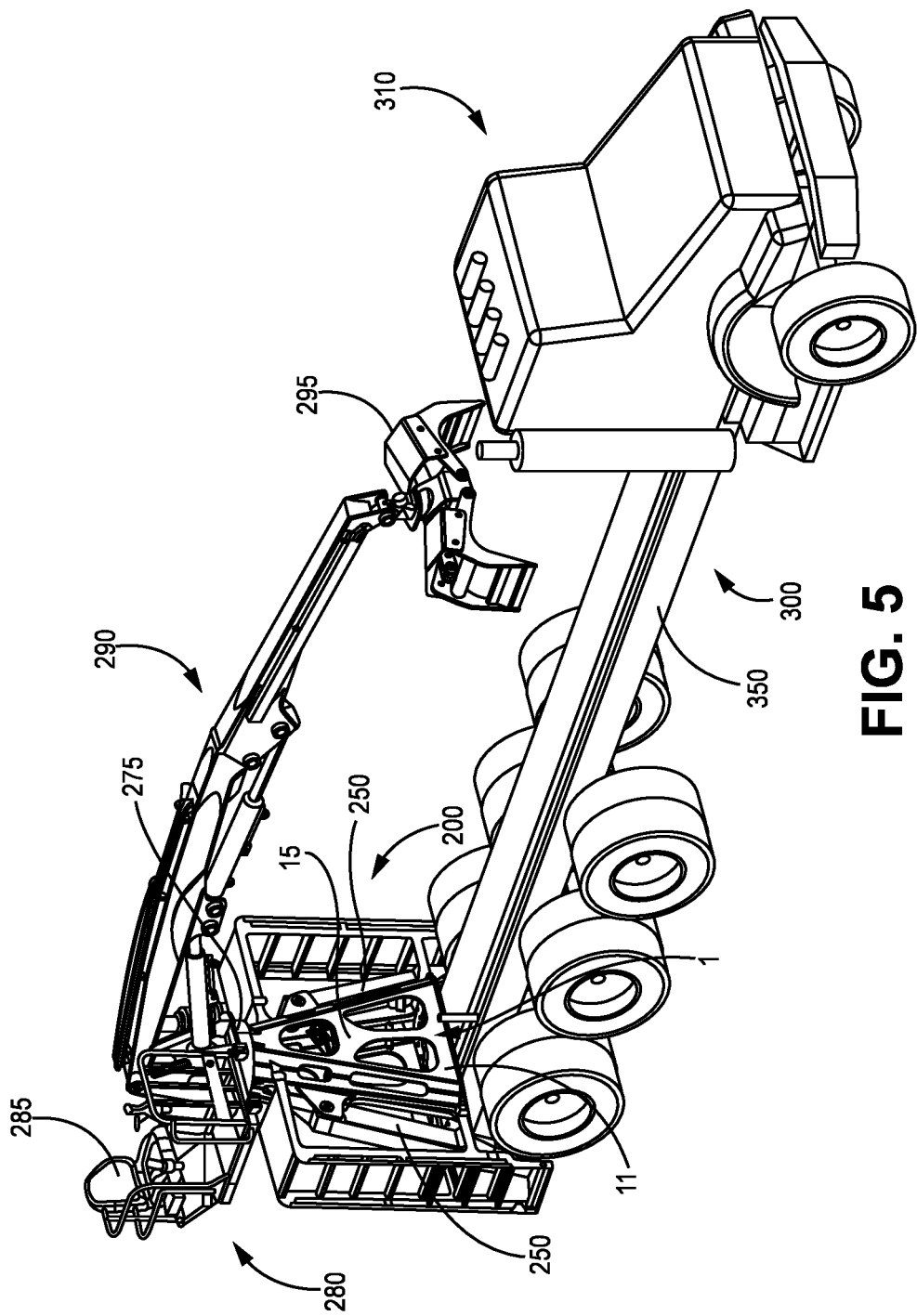
FIG. 5 is a perspective view of the material handler of FIG. 4 mounted operatively on a truck in accordance with certain embodiments of the invention.

In some embodiments, the material handler 200 is mounted in an operative position on a truck or trailer 300. Reference is made to FIG. 5. Preferably, the tower 1 comprises a plurality of mounting fasteners 700 that respectively extend through the plurality of interior mount openings 150 and are attached to a frame 350 of the truck or trailer 300. In such cases, the fasteners 700 have heads 700H located atop the interior portion 103 of the base plate 100, such that the housing 10 surrounds, and thereby protects, the heads of the plurality of fasteners. Reference is made to FIGS. 5, 6A, and 6B.

The mounting fasteners 700 can be part of any conventional mounting system. Thus, the mounting fasteners 700 can be conventional mounting studs. As shown in FIG. 6B, each pair of fasteners 700 can be bridged at their bottom end regions by a bracket plate. The fasteners 700 and bracket plates can be attached to a frame 350 of the truck or trailer 300. If desired, such fasteners and bracket plates can be attached to the frame using a conventional attachment assembly that also includes conventional frame stiffeners. The heads 700H of the fasteners 700 (once the fasteners are received in respective interior mount openings 150) comprise those portions of the fasteners above the base plate 100. The heads 700H of the fasteners 700 may comprise nuts, as shown in FIG. 6B.

In the non-limiting embodiment of FIG. 5, the tower 1 is part of the material handler 200 mounted in the operable position on the truck or trailer 300. As noted above, the material handler 200 comprises two stabilizers 250 located on opposite sides of the tower 1, a platform 275 located above the tower, and a boom 290 projecting away from the platform. The platform 275 is rotatable about a vertical axis relative to the tower 1. A grapple 295 is attached to the boom 290. The illustrated material handler 200 includes an operator station 280 comprising an operator seat 285 and conventional controls. In other cases, the operator station is omitted and the material handler has a remote control system.

The boom 290 can move the grapple 295 up and down (e.g., relative to a ground surface on which the truck or trailer rests), forward and rearward (e.g., further from or closer to a cab 310 of the illustrated truck), and side-to-side.

The details of the material handler 200 shown in FIGS. 4-6B are not limiting. Rather, these figures merely show one example of a suitable material handler 200 with which the present interior mounting system can be used. Suitable material handlers are commercially available from different suppliers, such as the present applicant: Builtrite Handlers & Attachments, of Two Harbors, Minnesota, USA. A wide variety of other material handlers can also be used.

Various non-limiting embodiments have been described. These and others are within the scope of the following claims.

The invention claimed is:

1. A material handler comprising a tower, two stabilizers located on opposite sides of the tower, a platform located above the tower, the platform being rotatable about a vertical axis relative to the tower, and a boom projecting away from the platform, the tower comprising a housing surrounding an interior space, the tower having an interior mounting system comprising a base plate through which a plurality of interior mount openings pass, the interior mount openings being located at positions of the base plate that are interior of the housing.

2. The material handler of claim 1, wherein the housing has a bottom end region that is joined to the base plate, the base plate comprises an interior portion that extends interiorly from the bottom end region of the housing, and the plurality of interior mount openings are located in the interior portion of the base plate.

3. The material handler of claim 2, wherein a central opening passes through the interior portion of the base plate, and the central opening is surrounded, about 360 degrees, by the base plate.

4. The material handler of claim 2, wherein the bottom end region of the housing comprises four corner regions, and the interior portion of the base plate comprises four corner regions located respectively adjacent the four corner regions of the bottom end region of the housing, and wherein at least two of the plurality of interior openings are located in each of the four corner regions of the interior portion of the base plate.

5. The material handler of a claim 4, wherein the base plate is a single integral metal plate that defines all four corner regions of the interior portion of the base plate.

6. The material handler of claim 1, wherein the base plate defines a bottom-most portion of the tower, and the housing has a bottom end region that is joined to the base plate.

7. The material handler of claim 2, wherein the base plate further includes an exterior rim portion that extends exteriorly from the bottom end region of the housing, and a plurality of exterior openings pass through the exterior rim portion of the base plate.

8. The material handler of claim 7, wherein the base plate comprises a single integral metal plate that defines both the interior portion and the exterior rim portion of the base plate.

9. The material handler of claim 1, further comprising one or more brackets that project interiorly from the housing, such that the one or more brackets are located in interior space, the one or more brackets holding hydraulic valves.

10. The material handler of claim 1, further comprising one or more hydraulic lines extending through the interior space surrounded by the housing.

11. The material handler of claim 1, wherein the material handler is mounted in an operative position on a truck or trailer, the tower comprising a plurality of mounting fasteners that respectively extend through the plurality of interior mount openings and are attached to the truck or trailer, the plurality of mounting fasteners having heads located atop the interior portion of the base plate, such that the housing surrounds and thereby protects the heads of the plurality of mounting fasteners.

12. A tower for a material handler, the tower comprising a housing surrounding an interior space, the tower having an interior mounting system comprising a base plate through which a plurality of interior mount openings pass, the interior mount openings being located at positions of the base plate that are interior of the housing.

13. The tower of claim 12, wherein the housing has a bottom end region that is joined to the base plate, the base plate comprises an interior portion that extends interiorly from the bottom end region of the housing, and the plurality of interior mount openings are located in the interior portion of the base plate.

14. The tower of claim 13, wherein the bottom end region of the housing comprises four corner regions, the interior portion of the base plate comprises four corner regions located respectively adjacent the four corner regions of the bottom end region of the housing, and wherein at least two of the plurality of interior openings are located in each of the four corner regions of the interior portion of the base plate.

15. The tower of claim 14, wherein the base plate is a single integral metal plate that defines all four corner regions of the interior portion of the base plate.

16. The tower of claim 13, wherein the base plate further includes an exterior rim portion that extends exteriorly from the bottom end region of the housing, and a plurality of exterior openings pass through the exterior rim portion of the base plate.

17. The tower of claim 16, wherein the base plate is a single integral metal plate that defines both the interior portion and the exterior rim portion of the base plate.

18. The tower of claim 12, further comprising one or more brackets that project interiorly from the housing, such that the one or more brackets are located in the interior space, the one or more brackets configured to hold hydraulic valves.

19. The tower of claim 12, wherein the tower is mounted in an operative position on a truck or trailer, the tower comprising a plurality of mounting fasteners that respectively extend through the plurality of interior mount openings and are attached to the truck or trailer, the plurality of mounting fasteners having heads located atop the interior portion of the base plate, such that the housing surrounds and thereby protects the heads of the plurality of mounting fasteners.

20. The tower of claim 19, wherein the tower is part of the material handler, the material handler comprising two stabilizers located on opposite sides of the tower, a platform located above the tower, the platform being rotatable about a vertical axis relative to the tower, and a boom projecting away from the platform.

* * * * *